Sept. 24, 1963 R. SEEWALT 3,104,907
CATCHER ATTACHMENT FOR VEHICLES
Filed May 5, 1961

INVENTOR
RAPHAEL SEEWALT
ATTYS.

United States Patent Office 3,104,907
Patented Sept. 24, 1963

3,104,907
CATCHER ATTACHMENT FOR VEHICLES
Raphael Seewalt, 11132 96th St.,
Edmonton, Alberta, Canada
Filed May 5, 1961, Ser. No. 108,085
2 Claims. (Cl. 293—34)

My invention relates to new and useful improvements in catchers for vehicles.

It is well known that if some means could be provided in order to prevent a person struck by an automobile, from subsequently being run over by said vehicle, then the injuries occurring to said person could be reduced considerably.

In order to accomplish this it is necessary to have a device which will engage the ground thus preventing the over riding of the person by the device which at the same time can be raised clear of the ground during normal operating conditions.

I have accomplished this by providing a plurality of catcher assemblies pivotally secured to a stationary bar in front of the vehicle and adapted to be swung to the vertical position when in use and to be raised clear from the ground surface when not in use, the operation of the device is being accomplished by means extending from adjacent the operator to the catcher assemblies.

The principal object and essence of my invention is therefore to provide a device of the character herewithin described which can readily be placed in position for use by the operator of the vehicle.

Another object of my invention is to provide a device of the character herewithin described which can be secured to the front bumper or front frame of the vehicle and yet which is retracted clear of the road surface when not in use.

A still further object of my invention is to provide a device of the character herewithin described which includes resilient means at the base of each catcher assembly so that each of the assemblies can maintain contact with the ground and prevent the over riding of the injured person occurring.

Another object of my invention is to provide a device of the character herewithin described the use of which will reduce damage occurring to persons run into by motor vehicles.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Proceeding therefore to describe my invention in detail, reference should be made to the accompanying drawings in which I have illustrated in phantom, the front end 10 of a conventional motor vehicle including the transverse front bumper 11 to which my device collectively designated 12 may be attached.

Figures 4, 5, 6:
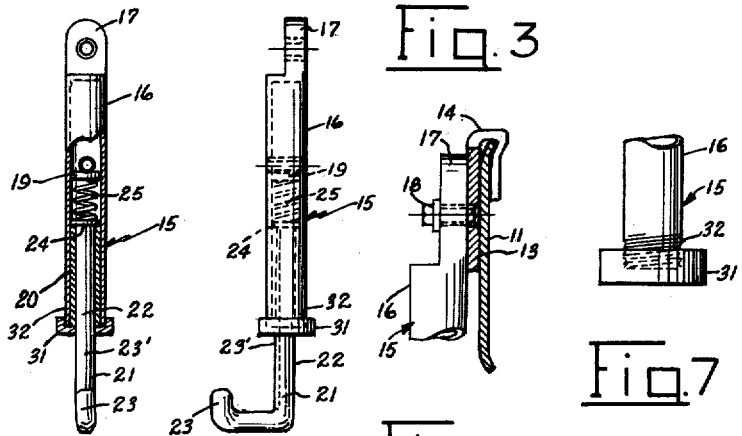
FIGURE 4 is a front partially fragmented elevation of one of the catcher assemblies.
FIGURE 5 is a view at right angles to FIGURE 4.
FIGURE 6 is an enlarged fragmentary perspective view showing the method of attaching the cross bar to the bumper.

My device consists of a transverse stationary cross bar 13 being provided with a plurality of hooks 14 upon the upper edge thereof whereby the device may be hooked over the front bumper 11 as shown specifically in FIGURE 6.

A plurality of catcher assemblies collectively designated 15 are provided and reference should be made to FIGURES 4 and 5 for the details of construction of these assemblies.

Each assembly consists of a cylindrical tube 16 having a lug 17 formed upon the upper end thereof by which means each assembly may be pivotally secured to the aforementioned cross bar 11 by means of pivot pin 18.

A barrier 19 spans the interior of the tube approximately medially along the length thereof and a split sleeve 20 is situated within the tube and below the barrier.

A catcher prong 21 consisting of a stem 22 is adapted to slide vertically within the resilient sleeve, a key 23' being formed on the stem and adapted to engage the split within the sleeve 20 to prevent rotation of this prong around its axis. However, the stem can reciprocate vertically within the tube and is provided with a head 24 with a resilient spring 25 reacting between the aforementioned barrier 19 and the head 24 normally retaining the stem in its extended position.

An angulated catcher prong 23 is formed on the lower end of the stem 22 and normally faces downwardly of the vehicle when in use.

Means are provided to raise and lower these catcher assemblies from the stationary bar and consist of a movable cross bar 26 pivotally secured to the tube 16 just above the barrier 19 by means of pivot pin 27.

Figure 1:
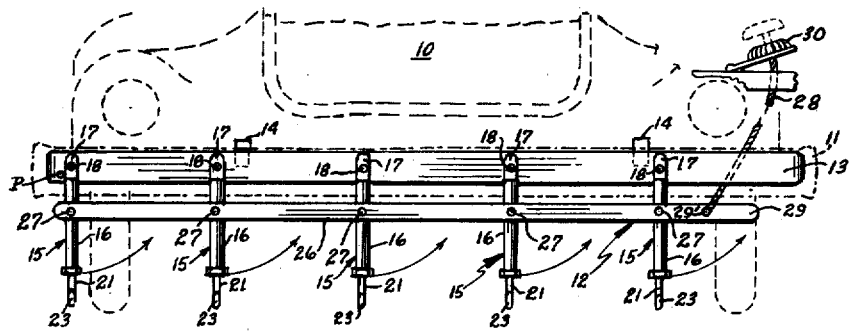
FIGURE 1 is a front elevation of a car with my device shown in the extended position.
Figure 2:
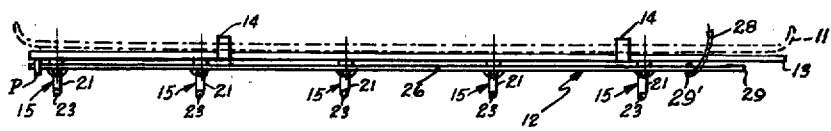
FIGURE 2 is a top plan view of the device per se.
Figure 3:
FIGURE 3 is a front elevation of the device per se but showing the device in the retracted position.

From the foregoing it will be appreciated that if the movable bar 26 is moved sideways with reference to FIGURE 1, then the catcher assemblies 15 will be swung upwardly to lie parallel with the cross bar as shown in FIGURE 3 or, alternatively, can be swung downwardly to be situated vertically as shown in FIGURE 1. In this connection a stop pin P extends from one end of the stationary bar 13 against which the end assembly 15 registers, thus maintaining the assemblies 15 vertical when in the lowered position.

I have provided flexible cable means 28 extending between one end 29 of the movable cross bar 26 and an operating lever 30 adjacent the operator and conveniently located on the dash board of the vehicle. In this connection pin 29' indicates a conventional flexible cable attachment means to the end 29 of the cross bar 26, the outer casing of cable means 28 being secured (not illustrated) to the bar 14.

Figure 7:
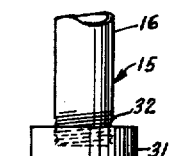
FIGURE 7 is an enlarged fragmentary view of the lower end of one of the catcher cylinders.

Finally reference should be made to FIGURE 7 which shows a screw capped end 31 adapted to be engaged over the lower end 32 of the tube 16 thus retaining the split sleeve, the stem, and the spring within the tube, this cap also being key slotted (not illustrated) to permit reciprocation of the stem.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A catcher attachable to the front bumper of a vehicle, comprising in combination a stationary cross bar, means to detachably secure said cross bar to the front bumper of said vehicle, a plurality of catcher assemblies each pivotally attached for sideways swinging movement by one end thereof, to said stationary cross bar, and remotely situated manual means operatively connected to said catcher assemblies for lowering said assemblies to the operating position vertically below said cross bar and raising said assemblies to a stored position substantially parallel to said cross bar, said catcher assemblies each including a cylinder closed at one end, a split sleeve within said cylinder, and a catcher prong slidable vertically within said split sleeve and extending from the other end of said cylinder, a resilient spring within said cylinder reacting between said closed end and said prong, normally maintaining said prong in the extended position, means on said prong cooperating with said other end of said cylinder maintaining said prong within said cylinder, and a key on the stem of said prong engaging said split sleeve to prevent rotation of said key within said cylinder.

2. The device according to claim 1 in which said means include a movable cross bar spanning said assemblies for sideways swinging movement relative to said stationary cross bar, below said stationary cross bar, and being pivotally secured to said assemblies whereby the sideways swinging movement of said movable cross bar swings said assemblies from the said operating position to the said stored position and vice versa.

References Cited in the file of this patent
UNITED STATES PATENTS

| | | |
|---|---|---|
| 1,282,858 | Kevil | Oct. 29, 1918 |
| 1,372,895 | Mork | Mar. 29, 1921 |
| 1,476,039 | Blair | Dec. 4, 1923 |
| 1,528,926 | Jones | Mar. 10, 1925 |
| 1,539,540 | Blair | May 26, 1925 |
| 1,544,444 | Gilewicz | June 30, 1925 |
| 1,716,106 | Bricuglio | June 4, 1929 |
| 2,232,726 | Perez | Feb. 25, 1941 |